Oct. 4, 1955
G. HEUWING
2,719,495
DOUGH CURLING MACHINE
Filed May 17, 1954
2 Sheets-Sheet 1
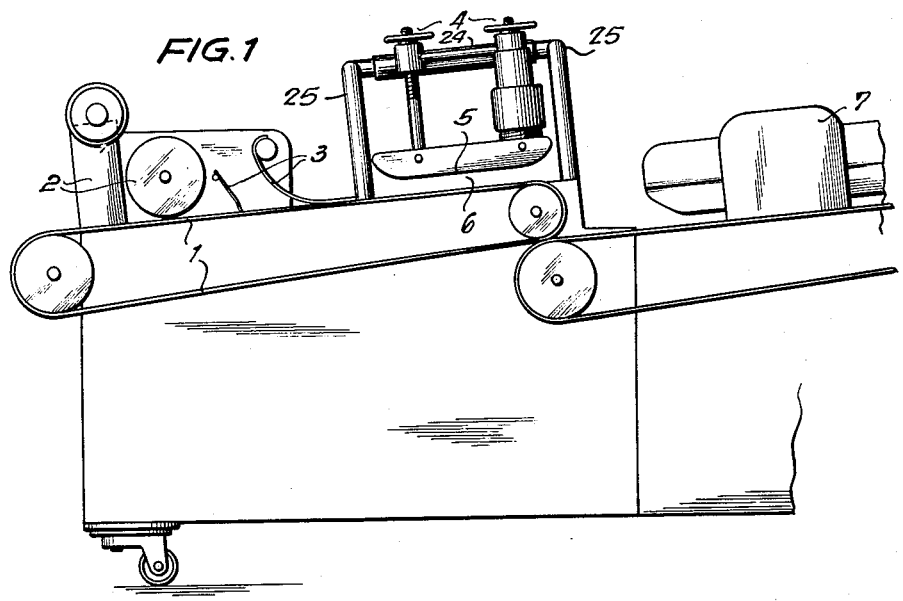
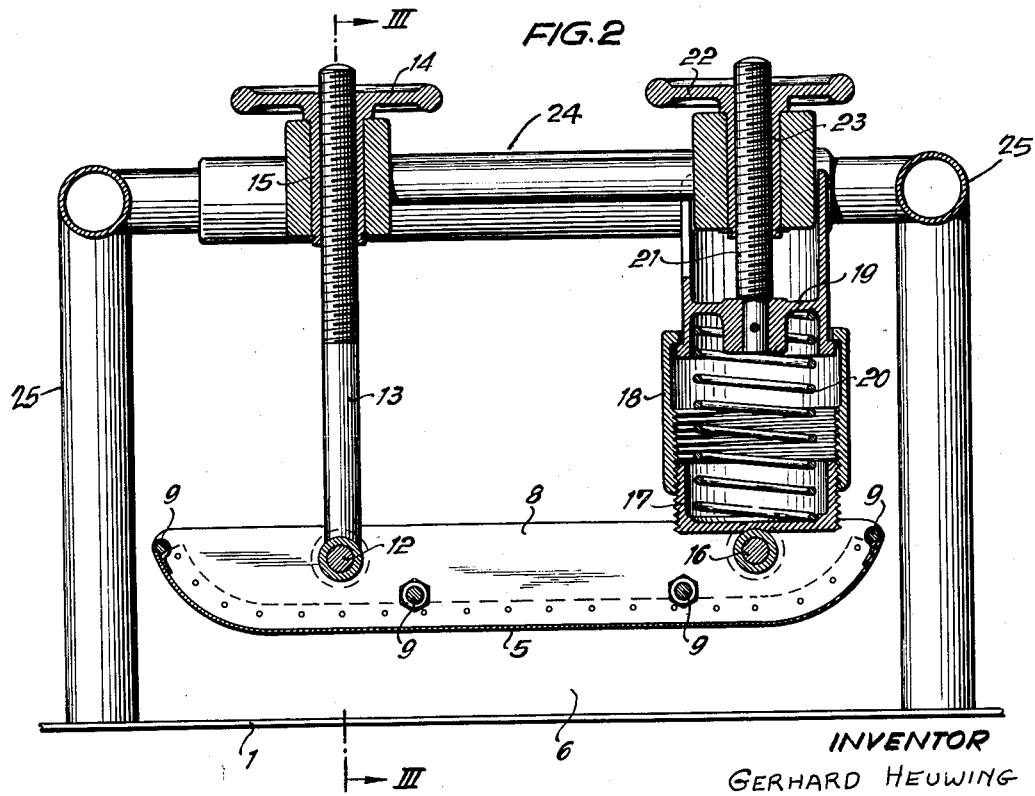
INVENTOR
GERHARD HEUWING
BY:

Oct. 4, 1955 G. HEUWING 2,719,495
DOUGH CURLING MACHINE
Filed May 17, 1954 2 Sheets-Sheet 2

INVENTOR
GERHARD HEUWING
BY:

United States Patent Office 2,719,495
Patented Oct. 4, 1955

2,719,495

DOUGH CURLING MACHINE

Gerhard Heuwing, Stuttgart-Bad Cannstatt, Germany, assignor to Werner & Pfleiderer, Stuttgart-Feuerback, Germany Application May 17, 1954, Serial No. 430,331

3 Claims. (Cl. 107—9)

The present invention relates to machines for treating dough which is to be made into bread and the like, and more particularly, the present invention relates to a machine for curling the dough into a closed helix.

Machines for accomplishing this result are already known, but they are extremely complicated and expensive and do not always produce the best possible results.

One of the objects of the present invention is to provide a dough curling machine which is of an exceedingly simple and inexpensive construction.

Another object of the present invention is to provide a dough curling machine which will efficiently curl a sheet of dough into a closed helix and which guarantees that the convolutions of the curled dough are pressed against each other with the required pressure, so that the best possible results are produced.

A further object of the present invention is to provide a means for adjusting a machine capable of accomplishing the above results both with respect to the gap through which the dough moves as well as with respect to the force which is applied to the dough.

With the above objects in view the present invention mainly consists of a dough curling machine which includes a flexible sheet material and a support means supporting the sheet material with a part thereof in stretched condition and out of contact with any other elements. A means is located opposite and spaced from the stretched part of the sheet material for moving the dough engaging the stretched sheet material along the same so as to thereby curl the dough against the stretched sheet material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic fragmentary elevational illustration of the environment in which the dough curling part of the machine is located;

Fig. 2 is a partly sectional fragmentary elevational view of the structure of the present invention.

Figure 3:
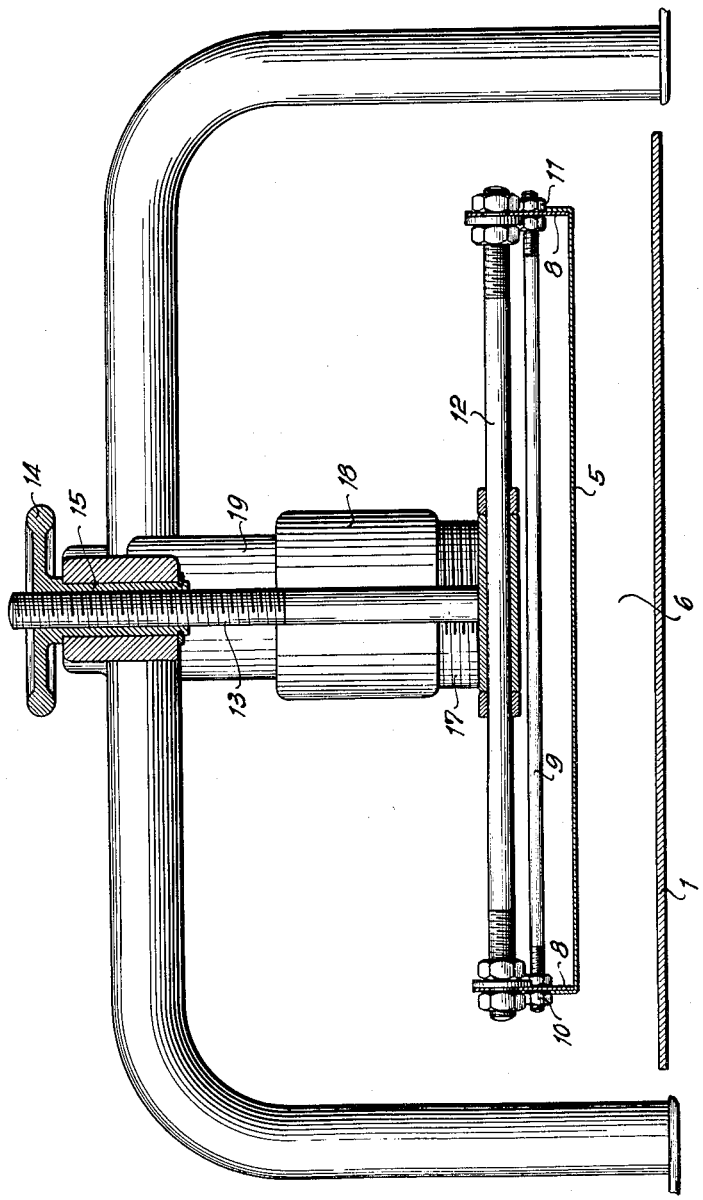
Fig. 3 is a sectional view taken along the line III—III of Fig. 2 in the direction of the arrows.

Referring now to the drawings, it will be seen that the machine includes a conveyer belt 1 and a roller apparatus 2 located over the conveyer belt so that dough passing between parts 1 and 2 and advancing to the right, as viewed in Fig. 1, is formed into a sheet of desired thickness. A means 3 is schematically illustrated in Fig. 1 over the conveyor belt 1 for forming in the sheet of dough the first half convolution of the dough. That is, after the dough moves to the right beyond the known means 3, the leading edge of the dough is curved back upon itself so as to form the beginning of the helical curling of the sheet of dough. Then the dough passes through the device 4 of the present invention which continuously curls the dough upon itself as the dough is advanced along the lowest part 5 of device 4 by the belt 1 which forms with part 5 a gap 6 through which the dough passes. Thereafter, the dough falls to a second conveyer belt by which the curled dough piece is passed through a bread-loaf forming device 7 known per se.

The details of the device 4 of the present invention are illustrated in Figs. 2 and 3 from which it may be seen that the part 5 is in the form of a sheet material which is flexible and which may for example be a textile material or a leather. The sheet material 5 is fixed at its opposite edges, by suitable rivets or the like, to the bottom edge portions of a pair of spaced side walls 8 which are maintained apart from each other to hold the sheet material 5 in stretched condition between the side walls 8. It will be noted that the sheet material is out of contact with any other elements at the part of the sheet material which is located between the side walls 8.

The side walls 8 are maintained apart from each other by a plurality of cross rods 9 extending between the side walls 8 and through suitable openings therein, the opposite ends of each rod 9 being threaded. The nuts 10 and 11 are threadedly carried by the threaded end portions of the rods 9, and as is apparent from Fig. 3, at each end portion of each rod 9 there are two nuts between which the corresponding side wall 8 extends. Thus, by adjusting these nuts on the rod 9 it is possible to adjust the extent to which the sheet material 5 is stretched. As is apparent from Fig. 2, the sheet material is looped at its front and rear ends and the front and rear cross rods 9 extend through the loops, respectively. It should further be noted that the opposite ends of each side wall 8 are curved away from the belt 1 so as to provide a converging entrance E to the gap 6 and a diverging exit A from the gap 6.

Adjacent the entrance end of side walls 8 there is located a cross rod 12 which is fixed to the side walls 8 in the same way as cross rods 9, and this cross rod 12 extends slidably through a sleeve to which the bottom end of a bolt 13 is fixed, this sleeve and bolt forming a carrying means for carrying the walls 8 adjacent the entrance end thereof. The bolt 13 is threaded along substantially its upper half, and this upper portion of the bolt 13 is in threaded engagement with the inner threads of a sleeve 15 which is fixed to a hand wheel 14. The sleeve 15 is carried by another sleeve for free rotation about the axis of bolt 13. Sleeve 15 is constrained against axial movement within the surrounding outer sleeve which is forming part of a stationary cross frame means 24 which extends between and is fixed to a pair of opposite stationary side frame means 25, as is evident from the drawings. Thus, by turning the hand wheel 14 the bolt 13 can be moved up or down to adjust the elevation of the cross rod 12 and the side walls 8 and sheet material 5 therewith, and it will be noted that the cross rod 12 can turn together with walls 8 and sheet 5 about the axis of rod 12 within the sleeve fixed to the bottom end of bolt 13.

Adjacent the exit end of walls 8 there is located a cross rod 16 which is joined to the walls 8 in the same way as rods 9 and 12. This cross rod 16 extends also slidably through a sleeve. This latter sleeve, shown in section in Fig. 2, is fixed, as by welding or the like, to the bottom face of a dish member 17 which is threaded along its outer side face. A coil spring 20 extends into and engages the dish member 17, and the top end portion of spring 20 extends into a dish member 19 provided with an upwardly extending tubular portion which is slidably located about a stationary part of the cross frame means of the machine, this stationary part of the cross frame means serving to rotatably support a sleeve 23 but preventing this sleeve 23 from moving axially. A bolt 21 is fixed to the dish member 19 and is in threaded engagement with inner threads of the sleeve 23 which is fixed at its top end to a hand wheel 22. A sleeve 18 is provided with inner threads and is in threaded engagement with the dish member 17, this sleeve 18 being carried by dish member 19 for free turning movement. As shown in Fig. 2 an outwardly extending annular flange at the bottom rim of the dish member 19 provides a support for an inwardly extending annular flange at the top end of sleeve 18, so that the sleeve 18 can be turned freely by hand but is not permitted to move downward beyond the bottom rim of dish member 19.

The above-described structure operates as follows:

As was pointed out above, by the device 3 the dough-sheet with its leading end is already turned up and partially rolled or curled in upon itself when the said dough-sheet arrives at the entrance end E of the gap 6. The dough is pressed against the sheet material 5 by the belt 1 and is simultaneously moved along the gap 6 by this belt. Since the sheet material 5 is stationary, the dough continues to be curled upon itself helically and the helix continually increases as the dough advances through the gap 6. Pressure is maintained on the convolutions of the helix by the sheet material 5 which gives way and bulges to some extent into the space between the side walls 8 as the dough is advanced toward the exit end A of the gap 6. The spring 20 becomes compressed, sleeve 18 sliding upwardly along the dish member 19, so that the sheet material 5 and walls 8 turn in a counterclockwise direction, as viewed in Fig. 2, about the axis of rod 12 as the dough is curled and advances toward the exit end A of the gap 6. Thus, the structure of the invention provides an exceedingly simple means for efficiently curling a sheet of dough into a closed helix whose convolutions are tightly pressed against each other with the required force. This latter force may be adjusted by varying the tension of the spring 20, which can be done by turning the sleeve 18 so as to locate the dish members 17 and 19 at a predetermined distance apart from each other. Also, the size of the gap may be independently adjusted by turning the hand wheels 14 and 22, and furthermore, the inclination of the sheet material and side walls 8 with respect to the conveyer belt 1 may be adjusted by turning one or the other or both of the hand wheels 14 and 22.

While the invention has been illustrated and described as embodied in dough curling machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In a dough curling machine, in combination, a pair of stationary side frame means; a cross frame means fixed to and extending between said side frame means; a conveyor belt extending between said side frame means and located beneath said cross frame means; a pair of elongated carrying means spaced along the length of said belt, being connected to said cross frame means and extending downwardly toward said belt; a pair of cross rods connected to the bottom ends of said pair of carrying means, respectively, and extending between said side frame means; a pair of side walls located opposite each other, extending along the length of said belt, and being fixed to opposite ends of said cross rods, said side walls having bottom edge portions located adjacent to but spaced from said belt; and a flexible sheet material fixed to and extending between said bottom edge portions of said side walls and being maintained between said side walls in stretched condition and out of contact with any other elements.

2. In a dough curling machine, in combination, a pair of stationary side frame means; a cross frame means fixed to and extending between said side frame means; a conveyor belt extending between said side frame means and located beneath said cross frame means; a pair of elongated carrying means spaced along the length of said belt, being connected to said cross frame means and extending downwardly toward said belt; a pair of cross rods connected to the bottom ends of said pair of carrying means, respectively, and extending between said side frame means; a pair of side walls located opposite each other, extending along the length of said belt, and being fixed to opposite ends of said cross rods, said side walls having bottom edge portions located adjacent to but spaced from said belt and each bottom edge portion being curved away from said belt at its opposite ends; and a flexible sheet material fixed to and extending between said bottom edge portions of said side walls and being maintained between said side walls in stretched condition and out of contact with any other elements.

3. In a dough curling machine, in combination, a pair of side walls having an entrance end and an exit end; means located between and connected to said side walls for maintaining the same spaced from each other; a flexible sheet material carried by said side walls and having a part extending between said side walls and maintained thereby in stretched condition out of contact with any other elements; means supporting said side walls adjacent said entrance end thereof for turning movement about an axis extending between and through said side walls; resilient means yieldably supporting said side walls adjacent the exit end thereof so that said side walls and said sheet material therewith turn about said axis upon yielding of said side walls adjacent the exit end thereof, said resilient means comprising a first dish member carried by said side walls between the same and adjacent said exit end thereof, a support located opposite said first dish member, a second dish member carried by said support opposite and facing said first dish member, and a spring extending between and engaging said first and second dish members and urging the same apart from each other; adjusting means for adjusting the force of said resilient means and comprising a sleeve turnably engaging one of said dish members and threadedly engaging the other of said dish members and a means for limiting the movement of said sleeve from said one toward said other dish member so that upon turning of said sleeve the distance between said dish members is regulated to adjust the force of said spring; and means located opposite and spaced from said part of said sheet material for moving dough engaging said part of said sheet material along said part.

References Cited in the file of this patent

UNITED STATES PATENTS

| | | |
|---|---|---|
| 1,192,156 | Bainbridge | July 25, 1916 |
| 1,242,753 | Aeschbach | Oct. 9, 1917 |
| 1,582,382 | Collis | Apr. 27, 1926 |

FOREIGN PATENTS

| | | |
|---|---|---|
| 464,314 | Germany | Aug. 15, 1928 |
| 641,565 | France | Apr. 21, 1928 |